(12) United States Patent
Oberhofer et al.

(10) Patent No.: US 12,001,486 B2
(45) Date of Patent: Jun. 4, 2024

(54) IDENTIFYING REFERENCE DATA IN A SOURCE DATA SET

(71) Applicant: International Business Machines Corporation, Armonk, NY (US)

(72) Inventors: Martin Oberhofer, Sindelfingen (DE); Joerg Rehr, Adendorf (DE); Ivan Matthew Milman, Austin, TX (US); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1249 days.

(21) Appl. No.: 16/583,372

(22) Filed: Sep. 26, 2019

(65) Prior Publication Data

US 2021/0097342 A1 Apr. 1, 2021

(51) Int. Cl.
*G06F 40/106* (2020.01)
*G06F 16/906* (2019.01)
*G06F 16/907* (2019.01)
*G06F 18/21* (2023.01)
*G06F 18/214* (2023.01)
*G06F 40/258* (2020.01)
*G06F 40/279* (2020.01)
(Continued)

(52) U.S. Cl.
CPC .......... *G06F 16/906* (2019.01); *G06F 16/907* (2019.01); *G06F 18/2148* (2023.01); *G06F 18/2178* (2023.01); *G06F 40/106* (2020.01); *G06F 40/258* (2020.01); *G06F 40/279* (2020.01); *G06F 40/284* (2020.01); *G06N 20/00* (2019.01); *G06V 30/19173* (2022.01); *G06V 30/412* (2022.01)

(58) Field of Classification Search
CPC .... G06F 16/906; G06F 40/106; G06F 40/258; G06F 40/279; G06F 40/284
See application file for complete search history.

(56) References Cited

U.S. PATENT DOCUMENTS 7,590,647 B2  9/2009  Srinivasan et al.
9,760,571 B1  9/2017  Ben-Natan et al.
(Continued)

OTHER PUBLICATIONS

Michelson et al., "Creating Relational Data from Unstructured and Ungrammatical Data Sources," Journal of Artificial Intelligence Research 31, 2008, pp. 543-590.

*Primary Examiner* — Sanchita Roy
(74) *Attorney, Agent, or Firm* — Kimberly Zillig

(57) ABSTRACT

A method, system, and computer program product for identifying reference data values in a source data set. The method may include inputting a block of attribute values to a predefined machine learning model. The method may also include receiving an indication of a presentation layout of the block of the attribute values and an associated reference data extraction method. The method may also include determining a reading direction of the block of values. The method may also include identifying one or more inspection areas in the reading direction of the block of values. The method may also include determining sets of the one or more inspection areas that share a common presentation feature. The method may also include identifying tokens in an inspection area. The method may also include determining if the inspection area includes reference data values. The method may also include outputting the reference data values.

20 Claims, 7 Drawing Sheets

(51) Int. Cl.
*G06F 40/284* (2020.01)
*G06N 20/00* (2019.01)
*G06V 30/19* (2022.01)
*G06V 30/412* (2022.01)

(56) References Cited

U.S. PATENT DOCUMENTS

| | | | |
|---|---|---|---|
| 2003/0018633 A1* | 1/2003 | Horn | G06F 17/18 |
| 2010/0174975 A1 | 7/2010 | Mansfield et al. | |
| 2012/0254205 A1* | 10/2012 | Fot | G06F 16/217 |
| | | | 707/756 |
| 2013/0031117 A1* | 1/2013 | Mandelstein | G06F 16/214 |
| | | | 707/758 |
| 2013/0238596 A1* | 9/2013 | Mandelstein | G06F 16/254 |
| | | | 707/716 |
| 2014/0006369 A1 | 1/2014 | Blanchflower et al. | |
| 2014/0278358 A1* | 9/2014 | Byron | G06F 40/177 |
| | | | 704/9 |
| 2015/0007010 A1* | 1/2015 | Byron | G06F 40/20 |
| | | | 715/227 |
| 2015/0309990 A1* | 10/2015 | Allen | G06F 40/177 |
| | | | 704/9 |
| 2018/0189299 A1 | 7/2018 | Jaggars et al. | |
| 2019/0340240 A1* | 11/2019 | Duta | G06V 30/15 |
| 2020/0175267 A1* | 6/2020 | Schäfer | G06V 10/82 |

* cited by examiner

| Type | Engine Cylinder | Transmission | Power kW (hp) | Capacity cm³ | Consumption mpg in town/ highway/ combination | CO₂ Emissions g/km categories | Purchase price (without tax) |
|---|---|---|---|---|---|---|---|
| A | 4 | long gear ratio | 75 (102) | 1.595 | 32.7 53.5 42.8 | 126 Euro 6 | $22,999 |
| B | 4 | manual transmission | 90 (122) | 1.595 | 31 52.3 42 | 131 Euro 6 | $23,499 |
| C | 4 | long gear ratio | 90 (122) | 1.595 | 34.1 57.4 45.2 | 120 Euro 6 | $23,999 |
| D | 4 | manual transmission | 115 (156) | 1.595 | 31.4 53.5 42.8 | 128 Euro 6 | $25,999 |
| E | 4 | dual clutch transmission | 135 (184) | 1.991 | 28 44.4 36.8 | 150 Euro 6 | $30,299 |
| F | 4 | Manual transmission | 155 (211) | 1.991 | 27 43.6 35.1 | 154 Euro 6 | $29,999 |

FIG. 5

| Drive and Chassis | Code | TT 111 | TT 112 | TT 113 | TT 222 | TT 223 | TT 224 | TT 333 | TT 334 | TT 335 | TT 336 | TT 444 | TT 445 | TT 446 | TT 447 |
|---|---|---|---|---|---|---|---|---|---|---|---|---|---|---|---|
| Chassis Standard | 10 | ■ | ■ |  | ■ | ■ | ■ |  | ■ | ■ |  | ■ | ■ | ■ |  |
| Lowered Chassis | 11 |  |  | 1 |  |  |  | 1 |  |  | 1 |  |  |  | 1 |
| Sports Suspension | 12 | ■ | ■ |  | ■ | ■ | ■ |  | ■ | ■ |  | ■ | ■ | ■ |  |
| Low Sports Suspension | 13 |  |  | 2 |  |  |  | 2 |  |  | 2 |  |  |  | 2 |
| 5-Speed Manual Transmission | 14 |  |  | 3 |  |  |  | 3 |  |  | 3 |  |  |  | 3 |
| 5-Speed Manual Transmission w/ Cruise Control | 16 |  |  |  |  |  |  |  | ■ | ■ | ■ | ■ | ■ | ■ | ■ |
| Automatic Transmission | 40 | ■ | ■ | ■ | ■ | ■ | ■ | ■ |  |  |  |  |  |  |  |
| Diesel | 41 | ■ | ■ | ■ | ■ | ■ | ■ | ■ | ■ | ■ | ■ | ■ | ■ | ■ | ■ |
| Start-Stop Function | 42 |  |  |  |  |  |  |  |  |  | 4 |  |  |  | 4 |

1 = Model Special Sport
2 = Model Race Edition
3 = Model Sport Smart Edition
4 = Model Ultrarace

FIG. 6

IDENTIFYING REFERENCE DATA IN A SOURCE DATA SET

BACKGROUND

The present disclosure relates to digital computer systems, and more specifically to identifying reference data values in a source data set.

Reference data sets are lists of values defining the permissible range of values for an attribute. Examples may include salutations, country codes, relationship types, bank account types, etc. It may be conventional to use reference data. For example, in order to go from unmanaged to a managed state (for example, with a reference data management (RDM) system) the reference data sets may need to be located, analyzed and loaded into such an RDM system.

SUMMARY

The present invention provides a computer-implemented method, system, and computer program product to identify reference data values in a source data set. The method may include inputting a block of attribute values to a predefined machine learning model. The method may also include receiving, from the machine learning model, an indication of a presentation layout of the block of the attribute values and an associated reference data extraction method. The method may also include determining a reading direction of the block of values. The method may also include identifying one or more inspection areas in the reading direction of the block of values. The method may also include determining sets of the one or more inspection areas that share a common presentation feature. The method may also include identifying tokens in an inspection area for each inspection area within a set of the one or more inspection areas. The method may also include determining if the inspection area includes reference data values using a distribution of the identified tokens. The method may also include outputting the reference data values. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 depicts a first example of a block of attribute values, according to some embodiments.

FIG. 6 depicts a second example of a block of attribute values, according to some embodiments.

Figure 1:
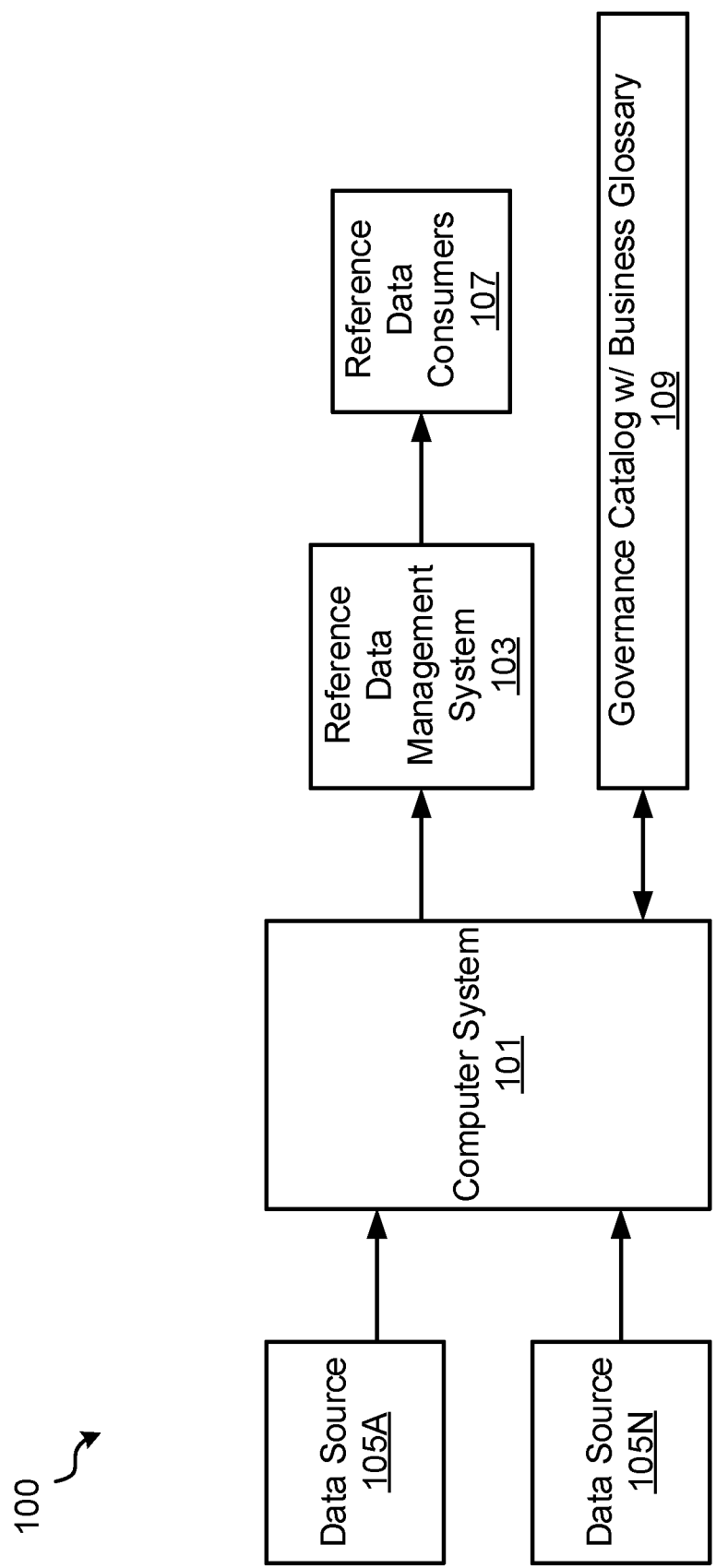
FIG. 1 depicts a schematic diagram of a data management system, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

However, most of the reference data sets are unmanaged and buried in structured and unstructured data sources.

The present subject matter may relate to automatically identifying reference data in structured data sources, semi-structured data sources such as JavaScript™ Object Notation (JSON) and Extensible Markup Language (XML) documents, and/or unstructured data sources such as Portable Document Format (PDF) documents. This may save processing resources that would otherwise be required by ad-hoc processing of reference data.

The present subject matter may enable an efficient and systematic identification of the reference data, thereby mitigating the risk of missing reference data. This may prevent data inconsistencies and data integration failures that may result from missing reference data.

Providing access to reference data of different sources may have an advantage that data lakes may be realized faster with a higher degree of value based on a higher quality of data, and digitization and automation efforts may be realized more reliably when using reference data. Once the reference data values are identified, users may define mappings for reference data sets in the same domain, helping data exchange between systems.

Presentation layout as used herein may refer to a structure in which information, such as attribute values, is being provided to a user. The presentation layout may refer to the structure as rendered by a viewer system for actual presentation to a human user in sensible form. For example, the block of values may be a grouping of fields of a form, wherein the grouping has a presentation layout which is a table (or tabular structure). The presentation layout refers to a method or way of the organization of the attribute values. Presentation layouts include for example: text, table, etc.

Machine learning may refer to a computer algorithm used to extract useful information from training data by building probabilistic models (referred to as machine learning models) in an automated way. The machine learning may be performed using one or more learning algorithms such as linear regression, K-means, classification algorithms, etc. A model may, for example, be an equation or set of rules that makes it possible to predict a category or to group input data into clusters. The model may be configured to provide a confidence score for each prediction it provides. The confidence score of a prediction may indicate the correctness of the prediction.

The tokenizer is configured to perform tokenization, wherein the tokenization is the process of converting a sequence of characters into a sequence of tokens such as strings with an assigned, and thus identified, meaning. The tokenizer may, for example, be configured to operate within a smallest detectable unit (e.g. table cell) of a presentation layout. The tokenizer may be applied to a cell in order to break out multiple values that may be stored within a single cell. If the inspection area comprises a group of cells (e.g., a table row or column), the tokenizer may be configured to perform the tokenization for each cell of the group of cells.

An inspection area may refer to a part of the block of values that contains information of interest to determine reference data. For example, the inspection area may correspond to a portion of the block of values whose text-based representation comprises an attribute value (for instance, the inspection area may be a word region in a text block). In one example, the inspection area may comprise one or more table cells (e.g., a table row or column). In some embodiments, inspection areas sharing a same presentation format are areas that have one or more common presentation features, such as areas belonging to a same column, a same row, or a same text block.

The block of values may be derived from the data source. The data source may be a structured, semi-structured, or unstructured source. The block of values may be obtained or extracted using OCR, image recognition and similar techniques. For example, the source data may be a PDF document including a table which forms the block of values.

The present method may automatically be processed (for example, upon receiving the block of values of the source data set). In one example, the source data set may be received and the block of values may automatically be identified/detected and extracted in a pre-processing step before being automatically processed by the present method. The pre-processing method may be performed by the computer system performing the present method, or may be performed in a remote system with the results of which being received at the computer system. The source data set may, for example, comprise a document or a stream of data. For example, the data of social media may be received as it happens (for instance, a stream sends new social media posts through an open connection as they happen, and the source data set, being processed, may comprise the data as it is received).

According to some embodiments, the method further includes using the distribution of the distinct identified tokens for determining if the set of inspection areas include reference data values. In some embodiments, the determination is only performed if the identified tokens of the set of inspection areas are of the same type. This may enable an accurate determination of reference data. Not considering tokens of the same type may result in wrong frequencies, as different token types may have a same value.

In some embodiments, if the presentation layout is a table, the method may further include testing if each inspection area in the first row and the first column of the table includes predefined header keywords, or has a font different from the remaining one or more fonts of the table, and marking the first row as a header row or header column if it comprises at least one predefined header keyword or if it has the different font. The header keywords may for example be attributes such as name, address, code etc. This embodiment may be advantageous as it may provide accurate reference data, because header rows or header columns may typically be ignored when providing reference data. In some embodiments, the method may include comparing the first value of a column (or a row) with all other values in that column (or that row) to check if the data type is the same. For example, if the first value in a column (or a row) is a String and all other values in that column (or that row) are integers, then, even if the first value of said column (or row) is not a known keyword, it may be the header description for that column (or that row). In such a case, the first value may be appended to the list of known tokens. The list of known tokens might be well-defined terms of a business glossary in an Information Governance Catalog or similar metadata management systems.

In some embodiments, determining that the inspection area is a header or a content area includes processing the header for keywords by assessing found tokens of the header through lookup comparison with a business glossary in an information governance catalog. The catalog may include keywords, and their explanation, and semantical classification into different domains in accordance with data classes. According to some embodiments, running the tokenizer includes ignoring an inspection area, which is part of the header row or header column. In some instances, the tokenizer may be run only on rows or columns which are not header rows or header columns. This may save processing resources that would otherwise be required for processing the header row or header column. For example, for assessing frequency distribution, the inspection area which is part of the header may be ignored or skipped. This means that, for a vertical reading direction, the inspection area of the first row in that column may be ignored and, for a horizontal reading direction, the inspection area in the first column of that row may be ignored.

According to an embodiment, the block of values includes one of a table block, image block, and structures between hashtags of a data stream (for example, the structure may be the hashtag and corresponding content). The block of values may be a tabular structure in an unstructured document. This may enable a broad range of application of the present method. The method may systematically be executed on different types of inputs avoiding necessary filtering features for selecting the right inputs of the method.

In some embodiments, the providing, or outputting, of the reference data values includes pushing the reference data values to a reference data management (RDM) system. This may enable a seamless integration of the present method in existing systems. This embodiment may enable an ability to go from an unmanaged to a managed state with RDM systems. The reference data may then be dispatched or provided to reference data customers.

In some embodiments, determining the reading direction comprises using visual signals comprising thick lines, larger fonts, bold fonts, different font types, and/or different font color.

According to some embodiments, the method further includes determining the size of the presentation layout and identifying the inspection areas using the determined size. For example, if the block of values is a table block and the reading direction is a vertical direction, the number of inspection areas in a given set may not exceed the number of rows N (or N-1 if the first row is a header row that is to be ignored). This embodiment may further increase the accuracy of the determined reference data. For example, this embodiment may avoid adding to a given set extra inspection areas that go beyond the size of the table (for instance, if the table has 10 rows, the set of inspection areas may not exceed 10 areas).

According to one embodiment, when the presentation layout is a table, determining the reading direction includes processing a first row and a first column of the table, the processing including determining if the first row or the first column comprises reference data values, and determining the reading direction of the table based on the result of processing the first row and the first column (i.e., based on the header information of the first row and/or the first column). In some embodiments, the reading direction indicates a direction, or path, of reading of the rows or reading of the columns of the table. This embodiment may provide an accurate method for determining the reading direction. This embodiment may save processing resources that would otherwise be required to process the whole table in order to determine the reading direction. For example, the presentation layout may be a table that represents a grouping of fields of a form, or may be a table of a PDF document.

According to an embodiment, the determining of the reference data values may include classifying the distinct identified tokens into a reference data class or a non-reference data class, or determining whether the tokens can be classified into a reference data class or a non-reference data class. In cases where the classifying does not result in one of the two classes (i.e., the reference data cannot be classified into one of the two classes), prompting a user for providing a classification of the distinct identified tokens. This may increase the efficiency of the present method by determining reference data of a larger dataset. This embodiment may further be advantageous as the user-classified blocks further enhance a training set that can be used to train the machine learning model.

In some embodiments, the method further includes receiving a training set indicative of sets of features, and training a predefined machine learning algorithm using the training set, thereby generating the machine learning model to predict for a set of features the presentation layout and the associated presentation layout specific reference data detection method. In some embodiments, each set of features is descriptive of a presentation layout. For instance, each set of features may be labeled to indicate the presentation layout and a presentation layout specific reference data detection method.

According to some embodiments, the set of features include at least one of data indicative of a presentation layout, number of attribute values, background class of the presentation layout, legend type of a legend of the presentation layout, and font type and font size of characters presented in the presentation layout.

In some embodiments, the method further includes updating the training set using the processed sets of features and associated results of processing, and using the updated training set for generating an updated machine leaning model for processing of further source data sets. This may enable a self-improving system and may further increase the accuracy of the determination of reference data in accordance with the present method. The updated machine learning model may further be used for further received source data sets in accordance with the present subject matter.

Referring now to FIG. 1, a diagram of a data management system 100 is depicted, according to some embodiments. The data management system 100 comprises a computer system 101 and one or more data sources 105A-N (collectively referred to as 105). The data sources 105 may, for example, provide structured data, semi-structured data, and/or unstructured data. The unstructured data may, for example, be provided in the form of forms, pricelists, etc. The semi-structured data may include social media content.

In some embodiments, the computer system 101 is configured to receive source data sets from the data sources 105 and to process the received data in accordance with the present subject matter, in order to identify reference data in the receive source data sets. As part of the processing, the computer system 101 may use keyword lists from an Information Governance Catalog 109, and more specifically the business glossary section in the Information Governance Catalog 109, for testing if a row or column in a given table is a header row or header column. This may be performed by comparing at least part of the values of the row or column with the keyword lists. For example, the catalog 109 may comprise known reference data terms and/or synonyms of said terms. Thus, instead of just (autonomously) detecting known keywords such as "code," the system 101 may dynamically react to such external terms by querying the catalog 109 to become more effective in its processing for determining header information. The reference data may then be pushed or sent to a reference data management system (RDM) 103. The RDM system 103 manages the reference data (e.g., sets, hierarchies, and mappings) and publishes the reference data to reference data consumers 107 (e.g., extract, transform, and load (ETL); data warehouse (DWH); Marts; master data management system(MDM); operational data store (ODS); and online transaction processing (OLTP) systems). The reference data consumers 107 may apply the reference data to their needs.

The computer system 101 may or may not be part of the RDM system 103. If it is part of the reference data system, this may enable a single and integrated component that performs a whole process of determining and managing reference data. If the computer system 101, as shown in FIG. 1, is not be part of the RDM system 103, a centralized approach may be enabled, in which the computer system 101 may provide, or output, the reference data to multiple RDM systems.

Figure 2:
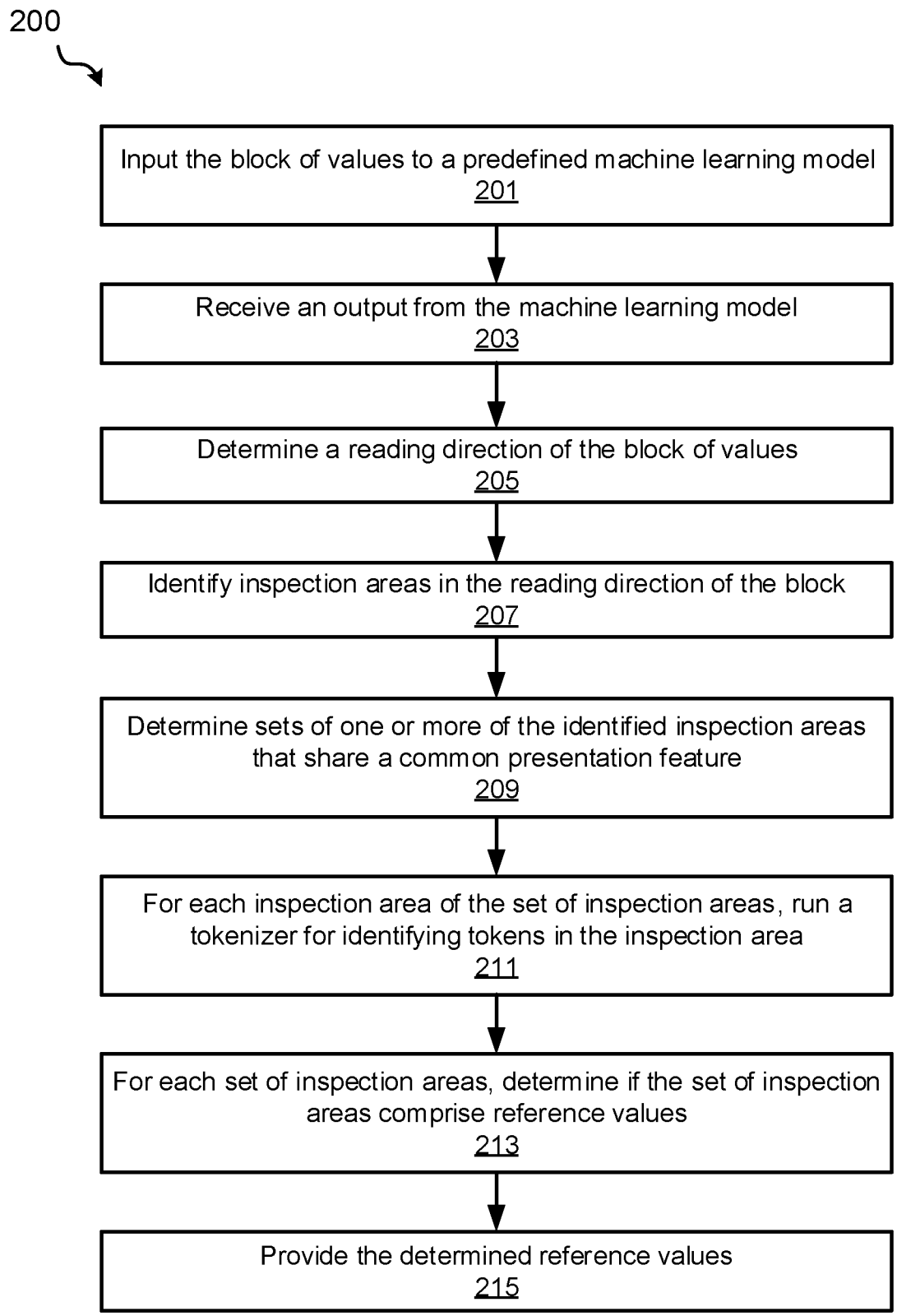
FIG. 2 depicts a flowchart of a method for identifying reference data values in a source data set including a block with attribute values, according to some embodiments.

Referring to FIG. 2, a flowchart of a method 200 for identifying reference data values in a source data set including a block with attribute values is depicted, according to some embodiments. In some embodiments, the block of attribute values is in a given format. The format may indicate how the values are laid out in terms of appearance, and the presentation layout may refer to a method or way of the organization of the attribute values. For example, the block of values may be a grouping of fields of a form, a table in a PDF document, etc. The present method may, for example, be performed by a computer system such as computer system 101 of FIG. 1. The source data set may, for example, be received at the computer system from one or more data sources such as data source 105 of FIG. 1. A received source data set may contain images, tables, or text paragraphs of data stream. For example, the sourced data set may be a document, a data stream (e.g. an ongoing stream of social media messages), etc. The document may be, for example, a BMP, PNG, JPEG, TIFF, searchable PDF, or non-searchable PDF document.

In some embodiments, the method includes a pre-processing step for performing a document layout analysis by scanning the received document or data streams and extracting the block of values in the form of images, tables, or structures between hashtags. The result of the pre-processing may enable understanding of the presentation layout of the block and separate it into different zones. The result of the pre-processing method may be layout components (for example, indicative of lines, words, and regions of the block of attribute values). The layout components may be obtained based on image processing techniques such as image binarization, image connected components extraction, noise removal, table extraction, text character extraction, line generation, and zone generation. These layout components may be described using a set of features. Examples of the result of the pre-processing may indicate where text blocks, paragraphs, and lines are located, or if there is a table or image. Layout components of a table block may include a number of horizontal and vertical lines, cells, etc.

The block of attribute values may be obtained as a result of the pre-processing method. It may be a table block, text block, structures between hashtags of source data set from social media, picture block, etc. In operation 201, the block of attribute values are inputted to a predefined machine learning model. For example, the values of the set of features of the block of values may be input to the machine learning model. The machine learning model may enable to recognize data patterns or data regularities in the input block of values. The machine learning model may, for example, be obtained as described with reference to FIG. 3.

In response to inputting the block of values to the machine learning model, an output is received from the machine learning model, in operation 203. The output may include an indication of the presentation layout of the block of values and an associated reference data extraction method. In some embodiments, the output of the machine learning model further includes a confidence score of the prediction it performed. For example, the higher the confidence score, the more accurate the prediction.

In some embodiments, the presentation layout is a table layout of a data table or a table layout of a grouping of fields of a form. The indication of the presentation layout may be values of layout parameters. For example, for a table layout, a layout parameter may be a number of columns, number of rows, cell size, whether the table has a legend, etc. For a stream of social media messages, a layout parameter may be the number of hashtags and number of paragraphs between pairs of hashtags.

For determining the reference data extraction method, the machine learning model may look at the input collection to determine which patterns for reference data mining are applicable. For example, for a text input file, only text analytics-based patterns may be selected, whereas for a PDF document a combination of text and image analytics may be required. The reference data extraction method may be configured to perform text analysis and/or image analysis in accordance with analysis steps that are suitable for extracting reference data from the block of values.

In operation 205, a reading direction of the block of values is determined, in accordance with the reference data extraction method. The reading direction may indicate a horizontal reading, vertical reading, legend-based reading, hashtags embedded reading, etc. For example, in a case of a table layout, a vertical reading may consist of reading the table column by column (e.g. top-to-bottom and left-to-right) and a horizontal reading may read the table row by row.

In some embodiments, the reading direction is determined using the layout parameter values as output by the machine learning model. The reading direction may, for example, be performed using visual signals such as thick lines, larger fonts, bold fonts, different font types, different font color, etc.

In operation 207, following the reading direction of the block of values, inspection areas are identified. An inspection area may comprise a word and/or character and/or symbol region. In a case of a table, the inspection area may be one or more table cells. In one example, the inspection areas may be identified making use of the size of the presentation layout. For example, the size of the presentation layout may indicate the number of rows, number of columns, embedded sections in a data stream, etc. This may enable determining the number of inspection areas to be processed together.

In operation 209, sets of one or more of the identified inspection areas that share a common presentation feature are determined. The common presentation format may indicate that inspection areas of a given set belong to a same row or same column. For example, if the reading direction is a horizontal direction, a set of inspection areas may belong to a same row of the table. In another example, if the reading direction is a vertical direction, a set of inspection areas may belong to a same column of the table. Thus, if the block of values is a table block having 5 columns, and a vertical reading is used, at most 5 sets of inspection areas may be identified. In some embodiments, a set of inspection areas may be inspection areas having the same nesting level in a data stream.

Each set of identified inspection areas of the sets of inspection areas may be processed separately for determining if it contains reference data. For instance, in operation 211, for each determined set of inspection areas, and for each inspection area of the set of inspection areas a tokenizer is run for identifying tokens in the inspection area. In some embodiments, an inspection area comprises a word region. Tokens may then be obtained by splitting the word region along a predefined set of delimiters like spaces, commas, and dots. A token may be a word or a digit, or punctuation. In some embodiments, the identified tokens may be classified to determine which ones are candidate attribute values. If the block of attribute values is a table (without legend), tokens which are punctuations may be ignored in the further processing of the method. In some embodiments, the processing of a given set of identified inspection areas of the sets of inspection areas may comprise a test if an inspection area of that given set is a header or a content area by detecting predefined keywords such as "code" and/or querying the catalog 109 (FIG. 1) for comparing the content of the inspection area with the keyword lists of the catalog 109. In some embodiments, if an inspection area is a header of content area it may be skipped or ignored when determining the reference data values. For example, the distribution of the distinct identified tokens may be determined for the given set of inspection areas without that inspection area being identified as a header.

In operation 213, it is determined if the set of inspection areas comprises reference values, for each set of inspection areas. In some embodiments, for each set of inspection areas, a list of distinct tokens as obtained by the tokenizer are used to determine the distribution of the distinct tokens. The distribution of the distinct identified tokens may be used for determining if the set of inspection areas comprise reference data values. Further, after processing all the determined sets of inspection areas, it may be determined if at least one set of these sets have reference data values.

In some embodiments, if for a given set of inspection areas the number of distinct tokens is lower than a predefined maximum number and are of the same type, the given set may be marked as reference data. If, for a given set of inspection areas, the number of distinct tokens is higher than the predefined maximum number and are of the same type, the given set may be provided to a user for human inspection for a final decision if it is reference data or mark it as non-reference data.

If reference data values are determined or found, they are provided, or outputted, in operation 215. For example, the determined reference data values may be pushed to a reference data management system (e.g., 103 (FIG. 1)) such that they can be provided to reference data consumers.

Figure 3:
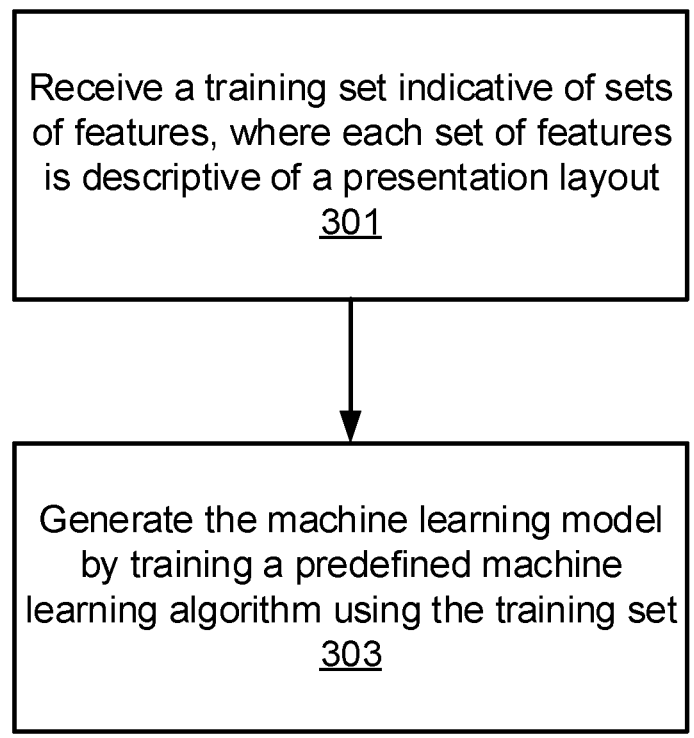
FIG. 3 depicts a flowchart of a method for generating a machine learning model, according to some embodiments.

Referring now to FIG. 3, a flowchart of a method 300 for generating a machine learning model is depicted, according to some embodiments.

In operation 301, a training set may be received (for example, by the computer system 101 (FIG. 1)). The training set may be indicative of different blocks such as work blocks and/or table blocks. Each block of the training set may be provided as a set of values of a set of features of the block. The set of features may include at least one of data indicative of a presentation layout, number of attribute values, background class of the presentation layout, legend type of a legend of the presentation layout, font type, and font size of characters presented in the presentation layout. Those blocks may be the results of one or more layout analysis documents. Each block may be labeled (for example, by one or more users) and the label may indicate the presentation layout of the block and the reference extraction method that is suitable or specific for this block for extracting reference data. The reference extraction method associated with a block of values may be a computer program that may be defined by a user such that it enables to extract reference data values from the block. For example, the training set for training the machine learning algorithm may be prepared by the one or more users for performing the present method. In another example, the training set for training the machine learning algorithm may be obtained from one or more sources. For example, the training set may be retrieved from a history database of a reference data management system (e.g., 103 (FIG. 1)).

In operation 303, a machine learning model is generated by training a predefined machine learning algorithm using the training set. The machine learning algorithm may be a supervised machine learning algorithm. The generated machine learning model may be configured to predict for an input block the presentation layout and the reference data extraction method that is suitable for extracting reference data from the block. The machine learning algorithm may, for example, be a decision tree algorithm, random forest algorithm or a neural network.

Figure 4:
FIG. 4 depicts a flowchart of a method for determining reference data for a table layout, according to some embodiments.

Referring to FIG. 4, a flowchart of a method 400 for determining reference data for a table layout is depicted, according to some embodiments. FIG. 4 may be described with reference to FIG. 5 and FIG. 6. FIG. 5 and FIG. 6 show two different example table layouts of block attribute values, one with a legend and the other without a legend.

Each of the tables 500 and 510 of FIG. 5 and FIG. 6, respectively, may be input to the machine learning model to determine or predict the presentation layout of each of the tables 500 and 510 and the associated reference data extraction methods. Steps of FIG. 4 may be performed in accordance with the predicted reference data extraction methods.

As shown in FIG. 5, table 500 has columns 503.1-N and rows 501.1-N. Table 510 of FIG. 6 has columns 513.1-N and rows 511.1-N. Table 510 has a legend 515 and at least part of the attribute values of the table 510 are symbols which are described in the legend 515.

In operation 401, the first row and first column of each of the tables (e.g., 500 and 510 (FIG. 5 and FIG. 6)) are processed for determining if the first row or the first column comprises a header type of information. For example, the first rows of tables 500 and 510 both comprise header keywords such as "code" in column 513.2 of table 510 and "Type" in column 503.1 of table 500. This indicates that the first rows of the two tables are header rows.

In operation 403, the reading direction is determined based on the result of operation 401. For FIGS. 5 and 6, the first rows being identified as header rows indicates that the reading direction for both tables 500 and 510 is a vertical reading, where the columns 503.1-503.N and columns 513.1-N may be read column by column and each column may provide a set of inspection areas. In addition to the reading direction, a reading method may be specified for the table 510 (FIG. 6) to indicate that the symbols in table 510 may be interpreted using the legend 515.

In operation 405, a set of inspection areas are determined for each of the processed/read columns (e.g., columns 503.1-503.N and columns 513.1-N (FIGS. 5 and 6)). The inspection area in example tables 500 and 510 may be the table cells that contain the attribute values. For example, for each column 503.1-N, the set of inspection areas may comprise at most 7 areas. In some embodiments, the inspection area comprising the header keyword may be excluded and thus the set of inspection areas of each column 503.1-N may comprise at most 6 areas. This step may result in a number of sets of inspection areas which are equal or smaller than the number of columns of the two tables 500 and 510.

In operation 407, each inspection area of the sets of inspection areas is processed by a tokenizer for identifying tokens in the inspection area. For table 510, the tokenizer may further be configured to map the symbols read in the inspection areas of table 510 to their respective values in the legend 515. In some embodiments, if a presentation layout shows a form that has a legend with recurring symbols in a table, then the table can be discarded but the symbols with their explanations extracted from the legend form. This may result in, for each column in the tables 500 and 510, a list of identified tokens. In some instances, the frequency distribution of these identified tokens may indicate if a column comprises reference data values or not. For example, if the number of distinct tokens is low and of the same type, the set of inspection areas may have reference data. If number of distinct tokens is high and of the same type, the set of inspection areas may not have reference data and may need further user inputs. If, for a set of inspection areas, the type of the tokens varies greatly, this set may not have reference data. In operation 409, the determined reference data values is pushed to an RDM system (e.g., 103 (FIG. 1)) for further use by reference data customers.

Figure 7:
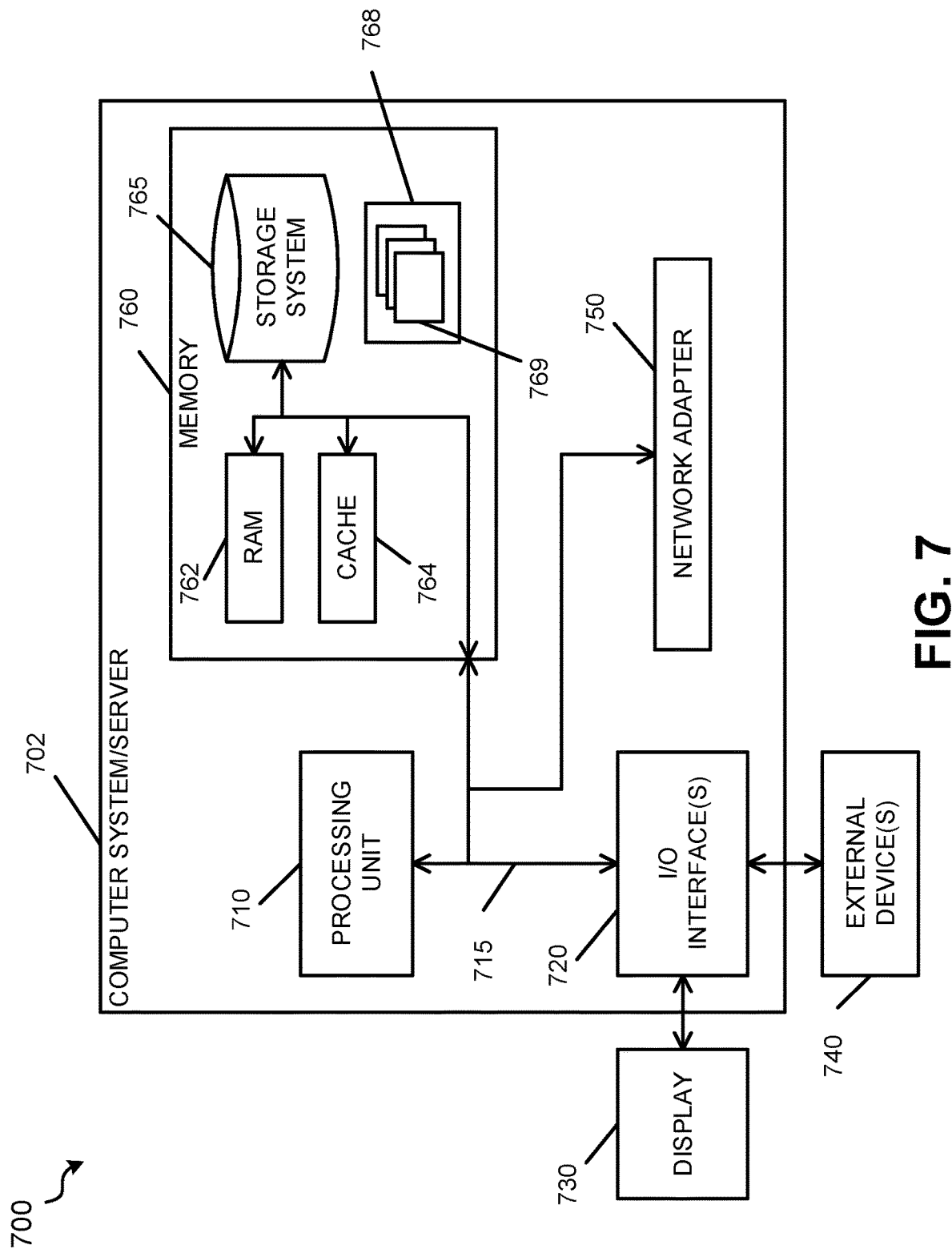
FIG. 7 depicts a block diagram of a sample computer system, according to some embodiments.

Referring now to FIG. 7, computer system 700 is a computer system/server 702 is shown in the form of a general-purpose computing device, according to some embodiments. In some embodiments, computer system/server 702 is located on the linking device. In some embodiments, computer system 702 is connected to the linking device. The components of computer system/server 702 may include, but are not limited to, one or more processors or processing units 710, a system memory 760, and a bus 715 that couples various system components including system memory 760 to processor 710.

Bus 715 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 760 can include computer system readable media in the form of volatile memory, such as random-access memory (RAM) 762 and/or cache memory 764. Computer system/server 702 may further include other removable/non-removable, volatile/non-volatile computer system storage media. By way of example only, storage system 765 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 715 by one or more data media interfaces. As will be further depicted and described below, memory 760 may include at least one program product having a set (e.g., at least one) of program modules that are configured to carry out the functions of embodiments of the disclosure.

Program/utility 768, having a set (at least one) of program modules 769, may be stored in memory 760 by way of example, and not limitation, as well as an operating system, one or more application programs, other program modules, and program data. Each of the operating system, one or more application programs, other program modules, and program data or some combination thereof, may include an implementation of a networking environment. Program modules 769 generally carry out the functions and/or methodologies of embodiments of the invention as described herein.

Computer system/server 702 may also communicate with one or more external devices 740 such as a keyboard, a pointing device, a display 730, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 720. Still yet, computer system/server 702 can communicate with one or more networks such as a local area network (LAN), a general wide area network (WAN), and/or a public network (e.g., the Internet) via network adapter 750. As depicted, network adapter 750 communicates with the other components of computer system/server 702 via bus 715. It should be understood that although not shown, other hardware and/or software components could be used in conjunction with computer system/server 702. Examples include, but are not limited to: microcode, device drivers, redundant processing units, external disk drive arrays, RAID systems, tape drives, and data archival storage systems, etc.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   inputting a block of attribute values to a predefined machine learning model;
   receiving, from the machine learning model, an indication of a presentation layout of the block of the attribute values and an associated reference data extraction method;
   determining a reading direction of the block of values;
   identifying one or more inspection areas, from the block of values, in the reading direction of the block of values;
   determining a set of the one or more inspection areas that shares a common presentation feature;
   identifying tokens in the set of the one or more inspection areas;
   determining if the set of the one or more inspection areas comprises reference data values, wherein the determining uses a frequency distribution of the identified tokens; and
   outputting the reference data values.

2. The method of claim 1, wherein the identified tokens of the set of the one or more inspection areas are a same type.

3. The method of claim 1, wherein the presentation layout is a table, further comprising:
   testing if each inspection area in a first row and a first column of a table comprises predefined header keywords.

4. The method of claim 3, further comprising:
   determining that the first row comprises at least one predefined header keyword; and
   marking the first row as a header row.

5. The method of claim 3, further comprising:
   determining that the first column comprises at least one predefined header keyword; and
   marking the first column as a header column.

6. The method of claim 1, wherein the block of values comprises at least one of: a table, an image, and a structure between hashtags of a data stream.

7. The method of claim 1, wherein outputting the reference data values comprises pushing the reference data values to a reference data management system.

8. The method of claim 1, wherein the presentation layout is a table, and wherein determining the reading direction of the block of values comprises:
   processing a first row and a first column of the table, the processing comprising:
      determining if the first row and the first column comprise header information; and
   in response to determining that at least one of the first row and the first column comprise header information, determining the reading direction of the table based on the header information.

9. The method of claim 1, wherein determining if the set of the one or more inspection areas comprises reference data values comprises:
   determining whether the identified tokens can be classified into a reference data class or a non-reference data class; and
   in response to determining that the identified tokens cannot be automatically classified into the reference data class or the non-reference data class, prompting a user to provide a classification of the identified tokens.

10. The method of claim 1, further comprising:
receiving a training set indicative of sets of features, wherein each set of features is:
descriptive of the presentation layout, and
labeled to indicate the presentation layout and the reference data extraction method specific to the presentation layout.

11. The method of claim 10, wherein each set of features comprises at least one of:
data indicative of the presentation layout, a number of attribute values, a background class of the presentation layout, a legend type of a legend of the presentation layout, and a font type and font size of characters presented in the presentation layout.

12. A system having one or more computer processors, the system configured to:
input a block of attribute values to a predefined machine learning model;
receive, from the machine learning model, an indication of a presentation layout of the block of the attribute values and an associated reference data extraction method;
determine a reading direction of the block of values;
identify one or more inspection areas, from the block of values, in the reading direction of the block of values;
determine a set of the one or more inspection areas that shares a common presentation feature;
identify tokens in the set of the one or more inspection areas;
determine if the set of the one or more inspection areas comprises reference data values, wherein the determining uses a frequency distribution of the identified tokens; and
output the reference data values.

13. The system of claim 12, wherein the identified tokens of the set of the one or more inspection areas are a same type.

14. The system of claim 12, wherein the presentation layout is a table, further configured to:
test if each inspection area in a first row and a first column of a table comprises predefined header keywords.

15. The system of claim 14, further configured to:
determine that the first row comprises at least one predefined header keyword; and
mark the first row as a header row.

16. The system of claim 14, further configured to:
determine that the first column comprises at least one predefined header keyword; and
mark the first column as a header column.

17. A computer program product comprising a computer readable storage medium having program instructions embodied therewith, the program instructions executable by a server to cause the server to perform a method, the method comprising:
inputting a block of attribute values to a predefined machine learning model;
receiving, from the machine learning model, an indication of a presentation layout of the block of the attribute values and an associated reference data extraction method;
determining a reading direction of the block of values;
identifying one or more inspection areas, from the block of values, in the reading direction of the block of values;
determining a set of the one or more inspection areas that shares a common presentation feature;
identifying tokens in the set of the one or more inspection areas;
determining if the set of the one or more inspection areas comprises reference data values, wherein the determining uses a frequency distribution of the identified tokens; and
outputting the reference data values.

18. The computer program product of claim 17, wherein the presentation layout is a table, and wherein determining the reading direction of the block of values comprises:
processing a first row and a first column of the table, the processing comprising:
determining if the first row and the first column comprise header information; and
in response to determining that at least one of the first row and the first column comprise header information, determining the reading direction of the table based on the header information.

19. The computer program product of claim 17, further comprising:
receiving a training set indicative of sets of features, wherein each set of features is:
descriptive of the presentation layout, and
labeled to indicate the presentation layout and the reference data extraction method specific to the presentation layout.

20. The computer program product of claim 19, wherein each set of features comprises at least one of:
data indicative of the presentation layout, a number of attribute values, a background class of the presentation layout, a legend type of a legend of the presentation layout, and a font type and font size of characters presented in the presentation layout.

\* \* \* \* \*